(12) United States Patent
Munje

(10) Patent No.: US 7,453,448 B2
(45) Date of Patent: Nov. 18, 2008

(54) USER INTERFACE AND METHOD OF ADAPTING A SENSOR SIGNAL TO ACTUATE MULTIPLE DIMENSIONS

(75) Inventor: Arun Munje, Nepean (CA)

(73) Assignee: Research In Motion Limited, Waterloo (CA)

(*) Notice: Subject to any disclaimer, the term of this patent is extended or adjusted under 35 U.S.C. 154(b) by 0 days.

(21) Appl. No.: 11/506,509

(22) Filed: Aug. 18, 2006

(65) Prior Publication Data

US 2006/0279539 A1    Dec. 14, 2006

Related U.S. Application Data

(63) Continuation of application No. 10/238,198, filed on Sep. 10, 2002, now Pat. No. 7,106,314.

(51) Int. Cl.
*G09G 5/00* (2006.01)
(52) U.S. Cl. .................. 345/184; 345/159; 345/163
(58) Field of Classification Search .............. 345/184, 345/159, 163
See application file for complete search history.

(56) References Cited

U.S. PATENT DOCUMENTS 5,298,919 A * 3/1994 Chang ...................... 345/163
5,546,106 A * 8/1996 Walgers .................... 345/184
6,330,717 B1 * 12/2001 Raverdy et al. ............ 717/170
6,658,573 B1 * 12/2003 Bischof et al. ............. 726/16
6,904,338 B2 * 6/2005 Weimper ................... 701/1

FOREIGN PATENT DOCUMENTS

EP            0 639 809 A1    2/1995

* cited by examiner

*Primary Examiner*—Richard Hjerpe
*Assistant Examiner*—Leonid Shapiro
(74) *Attorney, Agent, or Firm*—Jones Day; Krishna K. Pathiyal; Robert C. Liang

(57) ABSTRACT

A user interface for a mobile device includes an input sensor having one degree of freedom operable by the user to generate a sensor signal, a screen having a two-dimensional surface showing a graphical user interface object, a processor coupled to the sensor and to the screen to actuate the graphical user interface object along the two actuated axis, and a sensor adapter software module executed by the processor to adapt the sensor signal to actuate the graphical user interface object along both actuated axis. The adapter software module selectively drives the sensor signal to actuate the graphical user interface object along the first actuated axis, to actuate the graphical user interface object along the second actuated axis, and to change actuated axis.

21 Claims, 4 Drawing Sheets

USER INTERFACE AND METHOD OF ADAPTING A SENSOR SIGNAL TO ACTUATE MULTIPLE DIMENSIONS

CROSS-REFERENCE TO RELATED APPLICATION

This application is a continuation of U.S. application Ser. No. 10/238,198, filed Sep. 10, 2002 now U.S. Pat. No. 7,106,314 the entirety of which is hereby incorporated into this application by reference.

BACKGROUND

1. Field of Technology

This application relates generally to user interfaces for electronic devices having a thumbwheel, rollerwheel, or other input sensor used for actuating a cursor display, or other type of displayed object. More particularly, a method of adapting a sensor signal to actuate multiple dimensions for controlling a cursor in two dimensions is provided by operating an input sensor having only one degree of freedom. The technology is particularly well-suited for use in Personal Digital Assistants (PDAs), mobile communication devices, cellular phones, and wireless two-way communication devices (collectively referred to herein as "mobile devices"). The technology provides utility, however, in any device that would benefit from adapting a sensor signal to actuate multiple dimensions.

2. Description of the Related Art

In known device user interfaces, when a user imparts motion to an input sensor, such as a roller, having one degree of freedom, a cursor is actuated along a first dimension axis such as an up-down axis on the display. In order for the user to actuate the cursor along a second dimension axis on the display, such as a left-right axis, a modifier key, such as an alt key is usually depressed with one hand while the user imparts motion to the roller with the other hand. The use of both hands to actuate a displayed cursor in two dimensions may not be an acceptable solution for a device that needs to be used with only one hand, such as a mobile device.

SUMMARY

A method of adapting a sensor signal to actuate a displayed object, such as a cursor, situated in multiple dimensions in response to user stimulus of a sensor is provided. The method includes the steps of: (a) determining a magnitude from the sensor signal, the magnitude having a positive value for a signal corresponding to a first pre-determined user stimulus of the sensor and a negative value for a signal corresponding to a second pre-determined user stimulus; (b) defining an actuated axis originating at the object position, the axis having a direction spanning at least one of the multiple dimensions; (c) actuating the object along the actuated axis in proportion to the magnitude; and (d) changing the direction of the actuated axis upon detection of a trigger corresponding to a third pre-determined user stimulus.

DETAILED DESCRIPTION OF THE DRAWINGS

Figure 1:
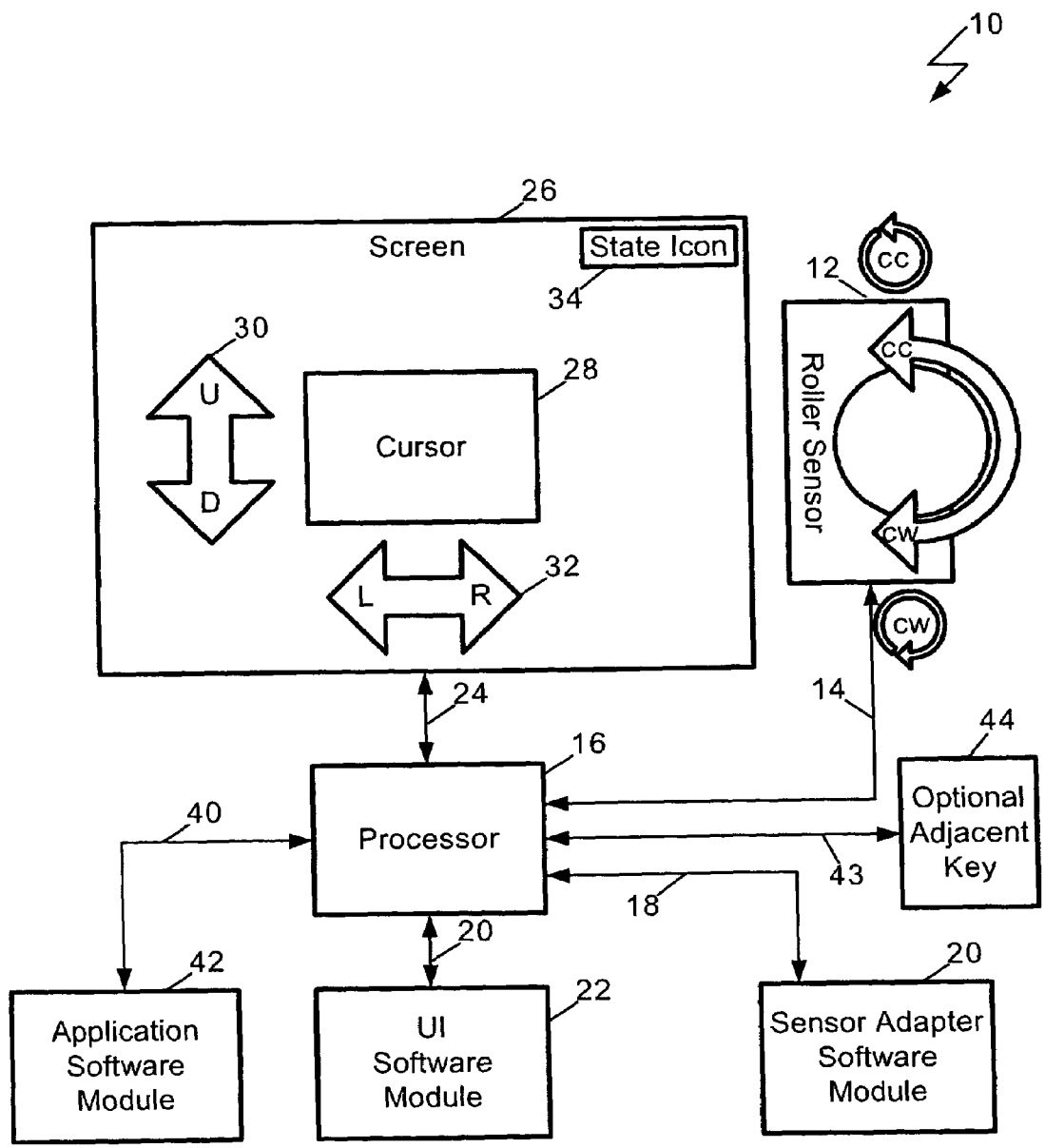
FIG. 1 is a block diagram illustrating a device user interface having a roller sensor with one degree of freedom connected to a processor that executes instructions in a sensor adapter software module to actuate two dimensions of a cursor displayed on a screen.

Referring now to the drawing, FIG. 1 is a block diagram illustrating a device user interface having a roller sensor with one degree of freedom connected to a processor that executes instructions in a sensor adapter software module to actuate two dimensions of a cursor displayed on a screen. User interface 10 includes a sensor 12 having one degree of freedom, which is operable by the user to generate a sensor signal by the user rolling the input sensor in either a clockwise (CW) direction or a counter-clockwise (CC) direction. Roller sensor 12 is connected to processor 16, and transmits signals 14 to the processor 16 whenever a user roll is sensed. When signaled 14, processor 16 executes instructions 18 provided by sensor adapter software module 20 to adapt the one dimensional signal 14 into two-dimensional signals accessible to processor 16. Processor 16 uses the adapted two-dimensional signals when executing instructions 20 provided by a UI software module 22. UI software module 22 provides instructions for processor 16 to control 24 screen 26.

Processor 16 is also coupled to screen 26, which provides a two-dimensional display surface showing a cursor object 28 to be actuated along a first actuated axis 30 corresponding to a first dimension and a second actuated axis 32 corresponding to a second dimension. Processor 16 adapts the sensor signal 14 using sensor adapter software module 20, and actuates 24 a cursor 26 to be displaced in two dimensions using UI software module 22, along the up-down axis 30 and along the left-right axis 32. Thus, when the user imparts motion onto the roller of roller sensor 12 in either the CW or CC direction, advantageously an actuation of cursor 28 can take place in either the up, down, left, or right direction. The two directions corresponding to the one dimension of sensor 12, as well as the two dimensions of cursor 28, are provided only as one example and are not meant to limit the scope of the invention, which can operate generally to increase the number of dimensions actuated by a sensor.

Processor 16 optionally displays a state icon 34 to indicate the state of sensor adapter software module 20, for example to indicate which axis or direction would be actuated by the motion of the roller.

If not used with all applications of the user interface 10, the UI software module 22 and sensor adapter software module 20 are re-used by processor 16 whenever it executes at least one application software module 42, in which case the cursor object 28 can take on various forms depending on the nature of application software module 42, such as a caret in a text editor component, a scroll bar in a UI element which is larger than the screen 26, a pointer, etc.

If user interface 10 provides for a second signal 43 to be generated with the same hand with which roller sensor 12 is operated, such as by depressing an adjacent key 44 situated with sufficient proximity to roller sensor 12, sensor adapter software module 20 can be configured to directly select which axis 30 or 32 will be actuated by roller sensor 12 in applications where the adjacent key 44 has no other function associated with it. Because this is the simplest embodiment of the method, it will be described first in reference to FIG. 2. In the general case where optional adjacent key 44 is not available or not present, however, it is preferred that sensor adapter software module 20 determine the axis 30 or 32 that is to be actuated based solely on the signal 14 of roller sensor 12.

Figure 2:
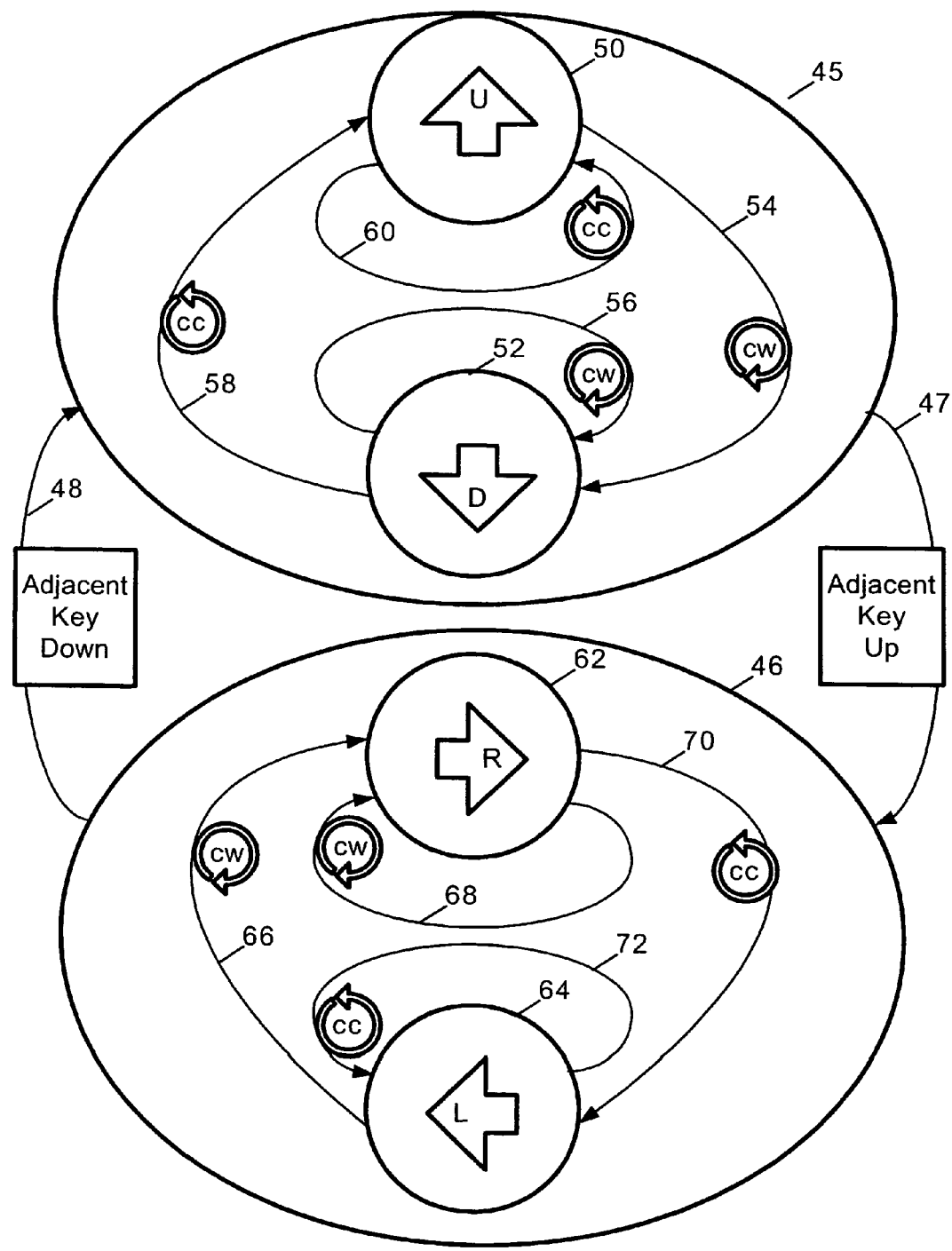
FIG. 2 is a state machine diagram illustrating a first embodiment of a method of adapting the sensor signal of the roller sensor of FIG. 1 to actuate the two dimensions of the cursor of FIG. 1.

FIG. 2 is a state machine diagram illustrating a first embodiment of a method of adapting the sensor signal 14 of the roller sensor 12 of FIG. 1 to actuate the two dimensions of the cursor 28. The state machine of FIG. 2, which is implemented by the software instructions provided by the sensor adopter software Module 20, includes two axis-states, an up-down axis-state 45, and a left-right axis-state 46, each containing a state machine for actuating the cursor 28 of FIG. 1 according to up-down axis 30 and left-right axis 32, respectively. Transitions 47, 48 from one axis-state 45, 46 to another 46, 45, respectively, occur based on the adjacent key 44 signal 43 of FIG. 1. Each axis-state 45, 46 in turn operates a state machine based solely on the one-dimensional roller signal 14.

The state machine of the up-down axis-state 45 has two states, up-state 50 and down-state 52, each representing opposite directions of axis 30 in FIG. 1.

A first step in the method includes tracking an actuated axis. The actuated axis changes upon the detection of a condition. In the case of the embodiment of FIG. 2, the condition is dependent on the adjacent key 44 signals 43 of FIG. 1.

A second step in the method includes tracking a current state. The current state changes upon the detection of a signal from roller sensor 12 of FIG. 1. Upon detection of a CW signal 54 or 56 caused by rotation of roller sensor 12, the current state becomes the down-state 52. Similarly, upon detection of a CC signal 58 or 60 caused by rotation of roller sensor 12 , the current state becomes the up-state 50.

A third step in the method includes actuating the cursor 28 as a function of the current state and the amount of rotation of roller sensor 12. Preferably, upon every transition to either the up-state 50 or down-state 52, the cursor 28 is actuated in the direction of the current state in proportion to the amount of rotation of sensor 12.

The state machine of left-right axis-state 46 has two states, right-state 62 and down-state 64, each representing opposite directions of axis 32 in FIG. 1.

Tracking a current state includes the same second step in the method described in reference to up-down axis-state 45. The current state changes upon the detection of a signal from roller sensor 12. Upon detection of a CW signal 66 or 68 caused by rotation of roller sensor 12, the current state becomes the right-state 62. Similarly, upon detection of a CC signal 70 or 72 caused by rotation of roller sensor 12, the current state becomes the left-state 50.

The same third step in the method described in reference to the up-down axis-state 45 above is pursued by actuating the cursor 28 as a function of the current state and the amount of rotation of roller sensor 12. Preferably, upon every transition to either of the right-state 62 or down-state 64, the cursor 28 is actuated in the direction of the current state in proportion to the amount of rotation of sensor 12.

Figure 3:
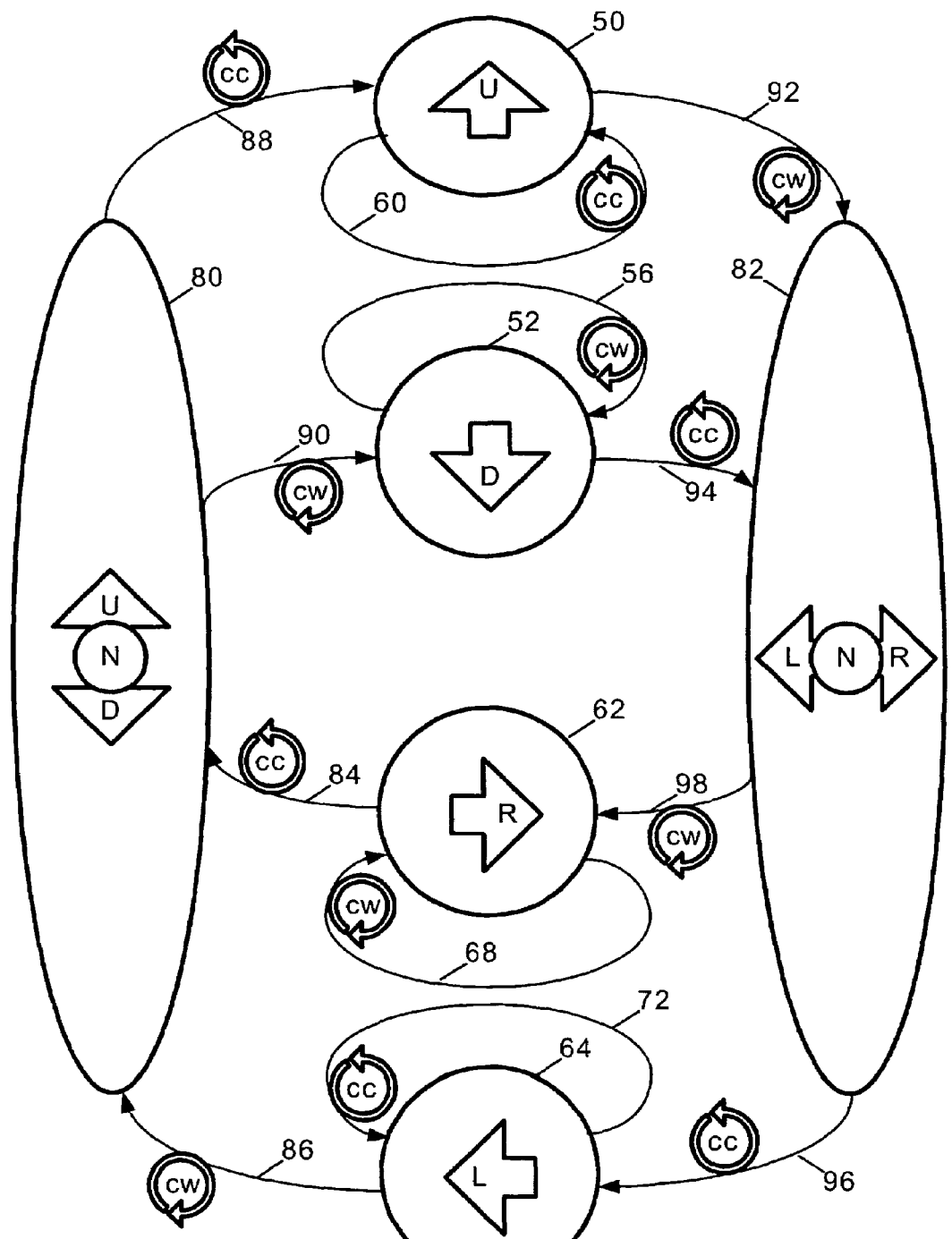
FIG. 3 is a state machine diagram illustrating a second embodiment of a method of adapting the sensor signal of the roller sensor of FIG. 1 to actuate the two dimensions of the cursor of FIG. 1.

FIG. 3 is a state machine diagram illustrating a second embodiment of a method of adapting the sensor signal 14 of the roller sensor 12 of FIG. 1 to actuate the two dimensions of the cursor 28.

The state machine of FIG. 3 changes the condition for tracking an actuated axis so that adjacent key signal 43 and adjacent key 44 are not necessary. The state machine combines the up-state 50 and down-state 52 of FIG. 2 for actuating along the up-down axis 30 of FIG. 1 with the right state 62 and left state 64 of FIG. 2 for actuating along the left-right axis 32 of FIG. 1.

Introducing two neutral states, the up-down neutral state 80 and the left-right neutral state 82, couples the two up-down axis states 50 and 52 of FIG. 2 with the two right-left axis states 62 and 72 of FIG. 2. Neutral states, such as 80 and 82, differ from direction states, such as 50, 52, 62 and 64, in that they do not cause the cursor 28 of FIG. 1 to be actuated when they become the current state. In this regard, axis states 45, 46 of FIG. 2 are also neutral states. Whenever the current state is a direction state, 50, 52, 62, 64, upon a change of direction of roller sensor 12, a neutral state 80 or 82 is entered.

If the current state is right 62 or left 64, continued rotation in the CW direction 68 and CC direction 72, respectively, will actuate cursor 28 of FIG. 1 along the right-left direction 32 of FIG. 1. CC rotation 84 or CW rotation 86 from a right-current state 62 or a left-current state 64, however, causes a transition to the up-down neutral state 80, which becomes current. Because up-down neutral state 80 is neutral, no actuation of cursor 28 occurs upon entering state 80. The next rotation of roller sensor 12 of FIG. 1, either CC 80 or CW 90, then causes either the up-state 50 or the down-state 90 to become current, respectively, thereby actuating cursor 28 along the up-down axis 30 of FIG. 1.

In an analogous manner, if the current state is up 50 or down 52, continued rotation in the CC direction 60 and CW direction 56, respectively, will actuate cursor 28 of FIG. 1 along the up-down direction 30 of FIG. 1. CW rotation 94 or CC rotation 84 from the up current state 50 or the down current state 52, however, causes a transition to the left-right neutral state 82, which becomes current. Because the left-right neutral state 80 is neutral, no actuation of cursor 28 of FIG. 1 occurs upon entering state 82. The next rotation of roller sensor 12 of FIG. 1, either CC 96 or CW 98, then causes either the left state 64 or the right state 62 to become current, thereby actuating cursor 28 along the left-right axis 32 of FIG. 1.

Thus, in comparison to the method of FIG. 2, the method of FIG. 3 introduces a new condition for the first step, which includes detecting a change of direction, and upon detection of the change of direction, using the state machine of FIG. 3 to thereby cause a change in the actuated axis.

Figure 4:
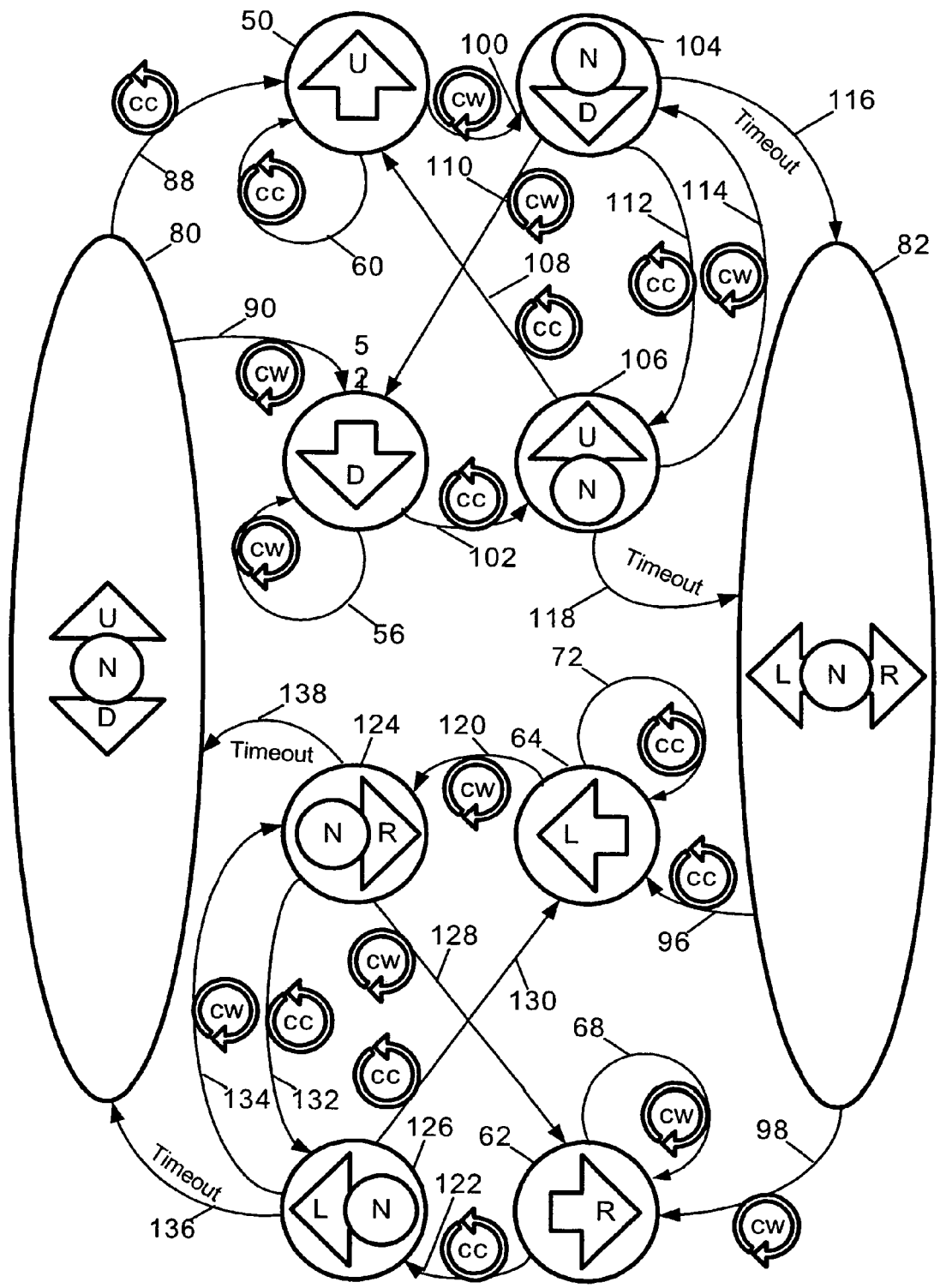
FIG. 4 is a state machine diagram illustrating a third embodiment of a method of adapting the sensor signal of the roller sensor of FIG. 1 to actuate the two dimensions of the cursor of FIG. 1.

FIG. 4 is a state machine diagram illustrating a third embodiment of a method of adapting the sensor signal 14 of the roller sensor 12 to actuate the two dimensions of the cursor of FIG. 1. The state machine of FIG. 4 improves upon the state machine of FIG. 3 by adding four additional neutral states, one per cursor direction, in addition to up-down neutral state 80 and left-right neutral state 82. The four additional neutral states are the down-neutral state 104, up-neutral state 106, right-neutral state 124 and left-neutral state 126. The four additional neutral states include common timeout transitions 116, 118, 136 and 138, in addition to CC and CW transitions. The introduction of timeout transitions enables quick reversal of direction along an axis.

Operationally, from an up-state 50 or a down-state 52, continued CC rotation 60 or CW rotation 56 of roller sensor 12 causes the upward or downward actuation respectively along the up-down axis 30 of cursor 28 of FIG. 1, as was the case in FIG. 2 and FIG. 3. Reversing the direction of rotation CW 100 or CC 102, however, causes the current state to become the down-neutral state 104 or the up-neutral state 106, respectively. Because the down-neutral state 104 and up neutral state 106 are neutral, no actuation of cursor 28 of FIG. 1 occurs. If the user does not impart motion onto the roller of roller sensor 12 in FIG. I before timeout 116 or 118 occurs, however, the current state transitions from down-neutral state 104 or up-neutral state 106 to left-right neutral state 82. This ensures that from up-state 50 and down-state 52, it is possible to put the user interface in a left state 64 or a right state 62. Furthermore, if the user continues to roll the roller sensor 12 in FIG. 1 in the new direction CW 110 or CC 108, respectively, before the timeout 116 or 118 occurs, the reverse direction down-state 52 or up-state 50 is entered. And if the user reverses direction CC 112 or CW 114 on roller sensor 12 in FIG. 1 before the timeout 116 or 118 occurs, then, the neutral state for the reverse direction up-neutral state 106 or down-neutral state 104 is entered. This ensures that, in the event that a user actuates cursor 28 of FIG. 1 beyond a desired position along axis 30, it is possible to actuate the cursor 28 in the opposite direction without having to first actuate the cursor along the left-right axis 32.

Similarly, from a left state 64 or a right state 62, continued CC rotation 72 or CW rotation 68 of roller sensor 12 of FIG. 1 causes the leftward or rightward actuation respectively along the left-right axis 32 of cursor 28 of FIG. 1, as was the case in FIG. 2 and FIG. 3. Reversing the direction of rotation CW 120 or CC 122, however, causes the current state to become the right-neutral state 124 or the left-neutral state 126, respectively. Because the right-neutral state 124 and left-neutral state 126 are neutral, no actuation of cursor 28 of FIG. 1 occurs. If the user does not impart motion onto the roller of roller sensor 12 in FIG. 1 before timeout 138 or 136 occurs, however, the current state transitions from right-neutral state 124 or up-neutral state 126, respectively, to up-down neutral state 80. This ensures that from right state 62 and left state 64, it is possible to put the user interface 10 of FIG. 1 in an up-state 50 or a down-state 52. Furthermore, if the user continues to roll the roller sensor 12 in FIG. 1 in the new direction CW 128 or CC 126, respectively, before the timeout 138 or 136 occurs, then the reverse direction right state 62 or left state 64 is entered, respectively. And if the user reverses direction CC 132 or CW 134 on roller sensor 12 in FIG. 1 before the timeout 138 or 136 occurs, then the neutral-state for the reverse direction left-neutral state 126 or right-neutral state 124 is entered. This ensures that, in the event that a user actuates cursor 28 of FIG. 1 beyond a desired position along axis 32, it is possible to actuate the cursor 28 in the opposite direction without having to first actuate the cursor along the up-down axis 32.

Thus, in comparison to the method of FIG. 3, the method of FIG. 4 introduces yet another condition for detecting the change of actuated axis in the first step, which includes detecting a timeout condition, and upon detection of the timeout condition, using the state machine of FIG. 4 to thereby cause a change in the actuated axis.

Having described in detail the preferred embodiments of the present invention, including the preferred methods of operation, it is to be understood that this operation could be carried out with different elements and steps. These preferred embodiments are presented only by way of example and are not meant to limit the scope of the present invention. This written description may enable those skilled in the art to make and use other embodiments having alternative elements that likewise correspond to the elements of the invention.

I claim:

1. A mobile device, comprising:
   a sensor having a degree of freedom operable in opposite directions to generate a sensor signal;
   a graphical user interface object to be actuated along a first actuated axis in opposite directions corresponding to a first dimension and along a second actuated axis in opposite directions corresponding to a second dimension;
   a processor for receiving the sensor signal and for actuating the graphical user interface object along a selected actuated axis in opposite directions and for adapting the sensor signal to actuate the graphical user interface object in opposite directions along both of the first and second actuated axes; and
   a key coupled to the processor to signal a change of actuated axis;
   wherein the graphical user interface object is actuated along the selected actuated axis in relation to the sensor signal when the sensor is operated in one direction, and wherein the selected actuated axis changes to the other actuated axis when the sensor is operated in the opposite direction or in response to the signal from the key.

2. The mobile device of claim 1, wherein the sensor is a roller-type sensor.

3. The mobile device of claim 2, wherein the roller-type sensor is a thumbwheel.

4. The mobile device of claim 1, wherein the graphical user interface object is selected from the group consisting of a cursor, a scroll bar, a view port, a sprite, an icon, graphics and text.

5. The mobile device of claim 1, wherein the processor is a virtual machine.

6. The mobile device of claim 1, wherein the processor processes Java byte-code instructions.

7. The mobile device of claim 1, further comprising at least one application software module executed by the processor.

8. A mobile device, comprising:
   a sensor having a degree of freedom operable to generate a sensor signal;
   actuation means for two dimensions actionable along a first dimension and a second dimension;
   a processor coupled to the sensor to receive the sensor signal and coupled to the actuation means to drive the actuation means;
   means for adapting the sensor signal to select an actuated axis within the two dimensions and for adapting the sensor signal to drive the actuation means along the actuated axis in opposite directions based on the sensor signal; and
   a key adjacent to the sensor and coupled to the processor to signal a change of actuated axis to the adaptation means.

9. The mobile device of claim 8, wherein the sensor is a roller-type sensor.

10. The mobile device of claim 9, wherein the roller-type sensor is a thumbwheel.

11. The mobile device of claim 8, wherein the actuation means is selected from the group consisting of a cursor, a scroll bar, a view port, a sprite, an icon, graphics and text.

12. The mobile device of claim 8, wherein the processor is a virtual machine.

13. The mobile device of claim 8, wherein the processor processes Java byte-code instructions.

14. A method in a mobile device having a sensor and a key of adapting a sensor signal to actuate an object in a plurality of dimensions on a display of the mobile device, comprising:
   (a) determining a value of the sensor signal, the value being a positive value for a signal corresponding to a first stimulus of the sensor and a negative value for a signal corresponding to a second stimulus;
   (b) defining an actuated axis associated with the object position on the display, the axis having a direction spanning at least one of the plurality of dimensions;

(c) actuating the object along the actuated axis in opposite directions in relation to the value; and (d) changing the direction of the actuated axis upon detection of a trigger corresponding to a third stimulus that is generated by state transitions between the first stimulus and second stimulus or by a change of axis signal generated by the key.

15. The method of claim 14, wherein the sensor is a roller-type sensor.

16. The method of claim 15, wherein the roller-type sensor is a thumbwheel.

17. The method of claim 14, wherein the object is selected from the group consisting of a cursor, a scroll bar, a view port, a sprite, an icon, graphics and text.

18. The method of claim 14, further comprising displaying a state icon to indicate the actuated axis that would be actuated by the first and second stimulus.

19. The method of claim 14, further comprising: detecting that the first stimulus is followed by the second stimulus to detect the third stimulus and cause the trigger of step (d).

20. The method of claim 14, further comprising: detecting that the second stimulus is followed by the first stimulus to detect the third stimulus and cause the trigger of step (d).

21. The method of claim 14, further comprising: detecting that the value has changed sign to detect the third stimulus and cause the trigger of step (d).

* * * * *